Sept. 9, 1969 T. H. COVERT 3,465,572
METHOD AND APPARATUS FOR SIMULTANEOUS TESTING OF
CONTAINERS FOR ABILITY TO WITHSTAND INTERNAL
PRESSURIZATION AND FOR FLUID LEAKAGE
Filed Jan. 29, 1968 2 Sheets-Sheet 1
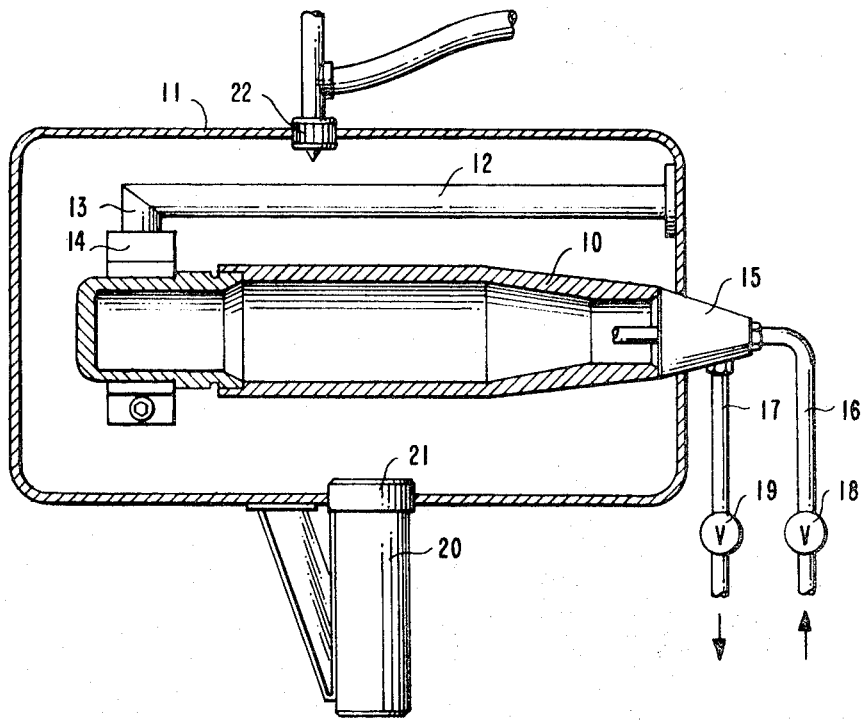
FIG. - 1
FIG. - 2
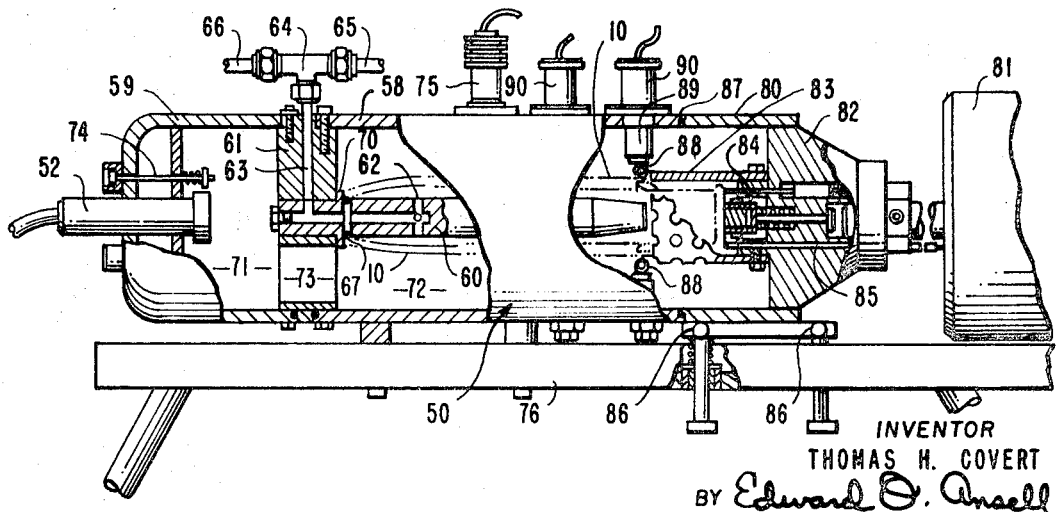
INVENTOR
THOMAS H. COVERT
BY Edward O. Ansell
William E. Hiller
ATTORNEYS Sept. 9, 1969 T. H. COVERT 3,465,572
METHOD AND APPARATUS FOR SIMULTANEOUS TESTING OF
CONTAINERS FOR ABILITY TO WITHSTAND INTERNAL
PRESSURIZATION AND FOR FLUID LEAKAGE
Filed Jan. 29, 1968 2 Sheets-Sheet 2
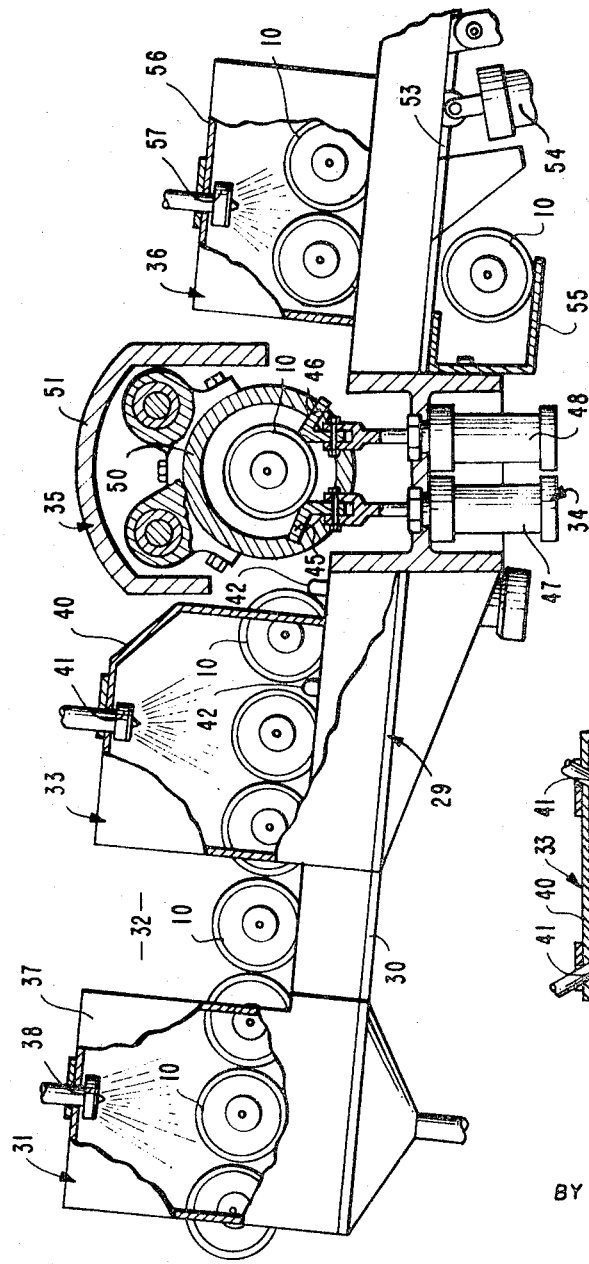
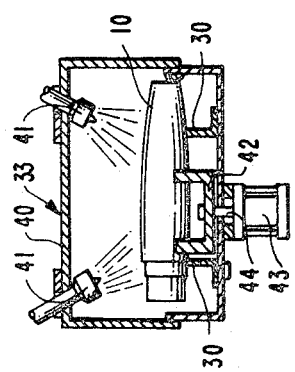
INVENTOR
THOMAS H. COVERT
BY Edward D. Ansell
William E. Hiller
ATTORNEYS United States Patent Office 3,465,572
Patented Sept. 9, 1969

3,465,572
METHOD AND APPARATUS FOR SIMULTANEOUS TESTING OF CONTAINERS FOR ABILITY TO WITHSTAND INTERNAL PRESSURIZATION AND FOR FLUID LEAKAGE
Thomas H. Covert, Downey, Calif., assignor to Aerojet-General Corporation, El Monte, Calif., a corporation of Ohio
Filed Jan. 29, 1968, Ser. No. 701,394
Int. Cl. G01m 3/04
U.S. Cl. 73—49.2                                                10 Claims

ABSTRACT OF THE DISCLOSURE

This disclosure concerns a method and apparatus for testing a container, such as a pressure vessel, with respect to two separate factors by a substantially simultaneous procedure, the two factors for which the pressure vessel is to be tested being (1) testing the pressure vessel to determine its ability to successfully withstand a predetermined internal pressure; and (2) testing for fluid leakage through the walls of the pressure vessel. In practicing the method, the pressure vessel is first subjected to an atmosphere of "saturated air" during which the exterior surface of the pressure vessel is coated with a very thin liquid film. The thin liquid film is characterized as being tacky and elastomeric in nature and as having the ability to form and reform small bubbles in areas of fluid leakage from the vessel which it coats. After the vessel has been coated with the thin liquid film, gaseous fluid, such as air, is introduced thereinto to internally pressurize the vessel to the desired pressure. During this stage, the vessel is tested for its ability to withstand a predetermined internal pressure, while also being monitored for any fluid leakage through the walls thereof. An ultrasonic detector is employed to monitor the vessel for fluid leakage which is detected from ultrasonic signals generated by the bursting of film bubbles formed and reformed in the liquid film by fluid leakage escaping from the vessel. The ultrasonic detector converts such ultrasonic signals into electrical signals indicative of the extent of fluid leakage, thereby establishing whether the pressure vessel meets minimum quality standards.

BACKGROUND OF THE INVENTION

This invention generally relates to the testing of containers, such as pressure vessels, for fluid leakage therefrom. More particularly, the present invention pertains to an improved method and apparatus for the testing of pressure vessels, wherein a gaseous medium is employed in internally pressurizing the vessel in conjunction with an ultrasonic leak detection system, wherein it is possible to perform two tests on the vessel, proof pressure and fluid leakage, simultaneously in a continuous substantially automatic operation.

Heretofore, the quality-control testing of a container, such as a pressure vessel, embodying testing for production proof pressure and testing for fluid leakage has involved essentially separate testing procedures, which by their nature are time-consuming and relatively expensive to complete. Commonly, the vessel is tested for production proof pressure by introducing water thereinto as the pressure medium to internally pressurize the vessel. This is followed by a leak testing procedure which usually involves the employment of gaseous pressure within the vessel followed by immersion of the vessel in a liquid in testing for fluid leakage. Because of the difference in the type of pressurization media employed in the two tests, the vessel after undergoing proof pressure hydro-testing using water as a pressurization medium, must be emptied of the water and the interior thereof dried through a suitable dehydration cycle. In one such specific example involving the quality-control testing of a casing or housing for a warhead rocket projectile, a typical drying cycle lasting a minimum of twenty minutes where the housing is heated to a temperature of 250° F. is required following the hydro-testing of the housing before fluid leakage testing using the standard procedure described above may be begun.

In a broader sense, the invention further contemplates an improved method and apparatus in testing a container, such as a pressure vessel, for fluid leakage alone. Various well-known methods have been employed for this purpose, among which are the so-called water immersion method, the soap solution method, and more recently a detection method relying upon the sensing of ultrasonic vibrations caused by fluid leakage flow.

The water immersion method of leak detection, as previously referred to, requires initial internal pressurization of the vessel by a gaseous medium, followed by immersion of the vessel in water. Visual observation of bubbles rising from the submerged vessel is relied upon as a means of detecting fluid leakage from the vessel. The reliability of this method suffers from errors in human judgment in appraising the visual observation of such bubbles, coupled with the inability of an observer to distinguish between bubbles arising from a leak orifice in the vessel being tested and bubbles caused by surface tension of the water in which the vessel is immersed, especially when the fluid leakage rate from the vessel is of a relatively low order, such as less than 0.005 cc./sec. A further complication with this method is caused by the unpredictable behavior of leakage bubbles emanating from the vessel being tested. At times, such leakage bubbles will rise to the surface of the water as a fine stream which can be visually observed, while at other times, small leakage bubbles will combine into one large bubble about the leakage orifice which may be readily mistaken by an observer as being a surface tension bubble.

The soap solution method of testing a pressure vessel for fluid leakage involves saturating the exterior surface of the vessel with a soap solution and then visually observing the soap solution for the formation of leakage bubbles. This method is also subject to errors in human judgment and is not suitable unless there is physical access to all areas being tested for fluid leakage. Moreover, the vessel being tested commonly requires intermittent applications of the soap solution thereto, since continued fluid leakage in an area of the vessel although going unobserved initially may dissipate the soap solution in the region thereof, following which no further observation of such fluid leakage is possible until the soap solution is renewed in the affected region.

The relatively recent method of detecting fluid leakage by employing an ultrasonic detector to sense ultrasonic vibrations developed by gas flowing through a leakage orifice in the vessel being tested has proved to be reliable. However, its effectiveness in detecting fluid leakage occurring at extremely low rates and through leakage orifices of microscopic size is questionable.

SUMMARY OF THE INVENTION

The present invention concerns an improved method and apparatus for detecting fluid leakage from a container, such as a pressure vessel, which relies upon the detection of ultrasonic signals generated by the fluid leakage in passing through a leakage orifice in the container undergoing testing. In this respect, the improved method relies upon the application of a liquid film or coating to the external surface of the test container, the liquid film being deposited on the container in a "saturated air" atmosphere and being characterized as having an elastomeric tacky nature so as to have the ability of forming and reforming small bubbles in areas where fluid leakage develops. The liquid film forms fine miniature bubbles of essentially uniform size as fluid leakage acts thereagainst, with the bubbles continually bursting and reforming as the fluid leakage continues. The bursting of these bubbles provides an ultrasonic signal which is significantly magnified over the ultrasonic signal developed by the vibrations caused when fluid escapes from a leakage orifice. These highly magnified ultrasonic signals generated by the repeated bursting of bubbles formed in the liquid film coating the container being tested significantly increases the leak detection sensitivity of the ultrasonic detector monitoring the container being tested for fluid leakage.

The liquid film repeatedly forms and reforms bubbles as such bubbles burst in areas of fluid leakage in accordance with the internal pressure of the container and the volume of gas escaping therefrom. The tiny bubbles developed in the liquid film remain round and uniform and enable fluid leakage from minor container defects, such as cracks, pinholes, porosity, and minor delaminations in laminated containers, to be readily detected by the improved method.

In a more particular sense, the present method and apparatus may be employed to simultaneously test a container for proof pressure and fluid leakage in a quality control operation, thereby avoiding separate testing of the container for these two purposes with the consequent increased expenses and time required thereby. The apparatus employed in practicing the method is substantially automatic in operation. In this respect, a container to be tested is directed through a "saturated air" chamber where the liquid film is applied to the exterior surface thereof. The container is then disposed in a burst-proof chamber where fluid pressure is introduced thereinto to internally pressurize the container up to proof pressure. Any fluid leakage causes the liquid film to form and reform small bubbles, the bursting of which generates ultrasonic signals of magnified extent which are detected by an ultrasonic detector extending within the burst-proof chamber. The ultrasonic signals are thereby converted to electrical signals indicative of the extent of fluid leakage, and such electrical signals are fed into an electrical control system which may include an audible and/or a visually observable alarm device which is actuated to produce an audible sound and/or to become illuminated whenever a container fails to pass either the proof pressure test or the fluid leakage test.

BRIEF DESCRIPTION OF THE DRAWING

In the drawings:

FIGURE 1 is a longitudinal sectional view, partially schematic in form, showing an apparatus capable of simultaneously testing a container for ability to withstand proof pressure and for fluid leakage in accordance with the present invention;

FIGURE 2 is an elevational view, broken away to show portions thereof in longitudinal section for purposes of clarity, and illustrating a testing apparatus employed in one phase of a quality control testing procedure for containers in accordance with the present invention;

FIGURE 3 is an elevational view, partially broken away to show portions thereof in section, and being schematic in form, illustrating a quality control procedure for testing containers which incorporates the testing apparatus of FIGURE 2 as one component thereof; and FIGURE 4 is a transverse sectional view, partially shown in elevation, and being schematic in form, which illustrates a "saturated air" chamber for applying a liquid film to the exterior surface of a container to be tested, the "saturated air" chamber being employed in the quality control testing procedure shown in FIGURE 3.

DETAILED DESCRIPTION

Referring more specifically to the drawings, the method and apparatus according to the present invention in its broadest aspect relate to an improvement in the procedure of testing a container, such as a pressure vessel, for fluid leakage. In this respect, it should be understood that the test item may comprise any container which might be subjected to internal pressurization including but not limited to conduits, such as pipes for transmitting gaseous or liquid materials, or conduits containing electrical cables. In the present instance, the method and apparatus are particularly shown in conjunction with the testing of the housing or casing 10 of a rocket motor or a warhead rocket projectile which could be made either of metal or of filament-wound glass fibers embedded in a resin matrix.

In FIGURE 1, a simplified embodiment of the invention is disclosed in which the container 10 (i.e. the rocket housing) to be tested is placed within a testing chamber 11. Suitable means are provided to mount the container 10 within the chamber 11. In this respect, the chamber 11 may include an elongated beam 12 extending lengthwise therewithin, one end of the beam 12 being rigidly secured to a chamber wall and the other end terminating in a depending arm 13 to which a segmental mounting ring 14 is fixedly attached. It will be observed that one end of the container 10 to be tested is received within the segmental mounting ring 14 which can then be adjustably tightened thereabout to clamp the container 10 in place, thereby suspending the container 10 within the chamber 11 in spaced relationship with respect to the walls thereof.

One end of the chamber 11 is provided with a suitable opening for receiving a pressure fixture or adapter 15. The adapter 15 is respectively connected to a pair of pressure lines or conduits 16 and 17. The conduit 16 comprises an inlet line for admitting pressure fluid into the container 10 and is provided with a suitable manually operable valve 18 for controlling the flow of pressure fluid therein. The conduit 17 comprises a pressure outlet communicating with the interior of the container 10 through the adapter 15 and includes a manually operable valve 19 therein for controlling the discharge of pressure fluid from the container 10 therethrough.

The adapter 15 is held against an open end of the container 10 within the chamber 11 in fluid-tight sealing relationship therewith. To this end, the face of the adapter opposed to the container 10 is provided with a suitable annular seal which is held against the open end of the container 10 so as to seal-off the interior thereof from the chamber 11, with the interior of the container 10 being in communication with the conduits 16 and 17 through the pressure adapter 15.

An ultrasonic detector 20 is mounted so as to extend within the chamber 11 in proximity to the container 10. This ultrasonic detector 20 includes a directional probe 21 which is preferably sensitive only to the ultrasonic frequency spectrum so as to prevent audible background noises from interfering with the signals given off thereby. In this respect, the probe 21 of the ultrasonic detector 20 is capable of sensing the ultrasonic vibrations given off by pressure fluid escaping from any leakage orifices in the container 10. Such ultrasonic vibrations are converted by the ultrasonic detector 20 into electrical signals indicative of the extent of fluid leakage from the container 10.

In accordance with the present invention, the testing chamber 11 is also provided with a liquid dispensing means in the form of a spray nozzle 22 which is connected to a source of liquid (not shown) by suitable conduit means. The spray nozzle 22 extends within the chamber 11 into proximity with the container 10 so as to introduce an atomized liquid within the chamber 11. The introduction of the atomized liquid within the chamber 11 by the spray nozzle 22 creates a "saturated air" condition within the chamber 11. In accordance with this invention, the liquid atomized within the chamber 11 is chosen from a liquid composition or mixture exhibiting certain characteristics or properties. Thus, the liquid composition is basically a water soluble material and upon being atomized within the chamber 11 forms a very thin coating or film on the exterior surface of the container 10. This liquid coating or film is of an elastomeric tacky nature and has the ability to form and reform small bubbles in areas where fluid leakage from the container 10 may occur. Such bubbles are of fine miniature substantially uniform size and are continuously created in any area where fluid leakage may occur from the container 10. As these bubbles burst, an ultrasonic signal is generated by the bursting thereof, the bursting of these bubbles being dependent upon the internal pressure of the container 10 and the volume of escaping fluid therefrom. The liquid composition or mixture upon being atomized within the chamber 11 preferably produces a thin liquid film on the exterior surface of the container 10 which has a natural affinity therefor, thereby enhancing the performance of the liquid film in repeatedly reforming small bubbles in areas of fluid leakage from the container 10. It is also contemplated that a static electrical charge may be provided on the exterior surface of the container to attract the atomized particles of the liquid composition or mixture to the exterior surface of the container 10 in establishing and maintaining a thin liquid film thereon.

The elastomeric tacky nature of the liquid coating or film is essentially determined by the viscosity of the liquid composition or mixture from which the liquid film is formed. Preferably, a viscosity-controlling substance is added to a liquid composition or mixture compatible therewith to obtain a liquid mixture from which a liquid film having the desired elastomeric tacky characteristics may be formed. By way of example, casein has been suitably employed as a viscosity-controlling substance in such a liquid mixture.

The ultrasonic signals generated by the bursting of bubbles formed in the liquid film are significantly magnified over the ultrasonic signals developed by vibrations as fluid flows through a leakage orifice. The ultrasonic signals generated by the bursting of the forming and reforming bubbles in the liquid film as fluid leakage develops in the container 10 are detected by the probe 21 of the ultrasonic detector 20, being converted thereby into electrical signals indicative of the extent of fluid leakage from the container 10. The sensitivity of the ultrasonic detector system shown in FIGURE 1 is greatly increased over such ultrasonic detector systems which rely upon the ultrasonic vibrations produced by leakage fluid as it flows through a leakage orifice in a container being tested. Thus, the improved apparatus described herein is capable of detecting extremely small rates of fluid leakage from a fluid container, such as might occur from minor defects in laminar layers of a resin-impregnated, filament-wound container, for example, or from minute cracks, pin-holes, porosity, and other defects of this type.

At the same time that the container 10 is undergoing testing for fluid leakage therefrom, it is being subjected to internal pressurization by the introduction of pressure fluid thereinto through the inlet pressure line 16 and the pressure adapter 15 so as to raise the internal pressure thereof to the proof pressure which the container 10 must be capable of withstanding without rupture. It will be understood, however, that the improved ultrasonic detector system described herein may be employed to test a container for fluid leakage, where the container is already internally pressurized by having a supply of a particular pressure fluid therewithin, such as oxygen, for example.

Referring now to FIGURES 2–4, inclusive, a quality control system for simultaneously testing containers for their ability to withstand proof pressures and for fluid leakage therefrom is illustrated, wherein such containers take the form of individual housings for a rocket motor or warhead projectile. The complete quality control system is shown in FIGURE 3 and includes an inclined chute or conveyor 29 down which the containers 10 to be tested descend under the action of gravity so as to pass through the plurality of stations comprising the quality control apparatus. The various stations comprising the quality control apparatus are: (1) a container washing station 31; (2) an air drying station 32; (3) a "saturated air" station 33 for applying a liquid film or coating to the respective containers 10; (4) a container receiving and ejecting station 34; (5) a testing station 35 for simultaneously testing each container 10 for its ability to withstand proof pressure and for fluid leakage; and (6) a film removing and rust inhibitor station 36. The quality control system of FIGURE 3 is substantially automatic, requiring only manual loading of the containers 10 to be tested onto the inclined chute 29 at the upper end thereof, the handling of the containers 10 rejected by the system following failure of one or both of the simultaneous tests carried on at the testing station 35, and observation of the system.

The operational sequence of the quality control system involves a pre-test conditioning of the containers 10 accomplished at stations 31, 32, and 33. In this respect, the container 10 is loaded onto a feeder chute portion 30 of the inclined chute 29 at the upper end thereof so as to extend transversely across the feeder chute 30. The container 10 is initially passed through the first station 31 which comprises a washing station including a substantially enclosed housing 37 having a suitable liquid dispensing means disposed therein, such as a nozzle 38, for directing a liquid washing spray downwardly onto the external surface of the container 10 as the container 10 rolls down the feeder chute 30. The liquid washing solution may comprise trichloromethane and removes foreign matter from the surfaces of the container 10.

The container 10 then passes through a second station 32 where it is dried. The drying of the container 10 may be accomplished in any suitable manner, such as by directing air blasts thereagainst. However, as shown in FIGURE 3, the container 10 is dried by exposing it to air under ambient conditions.

After the container 10 has been dried at the second station 32, it continues to descend the inclined feeder chute 30 and passes into the third station 33 comprising the "saturated air" station. The "saturated air" station 33 includes a housing 40 defining a chamber into which the container 10 is introduced. The housing or chamber 40 is provided with a suitable means to dispense an atomized liquid mixture or composition into the chamber so as to deposit a coating or film of the liquid mixture or composition on the external surface of the container 10. As shown, the atomized liquid dispensing means comprises one or more spray nozzles 41 extending within the chamber 40 from the top wall thereof and connected to a suitable source of the liquid composition or mixture (not shown). It will be understood that the liquid mixture or composition is the same as that previously discussed in describing the apparatus illustrated in FIGURE 1.

Referring to FIGURE 4, the third station or "saturated air" station 33 is illustrated in greater detail. The third station 33 is also provided with a pair of stop assemblies 42, 42 which are disposed in transverse relation to the longitudinal extent of the inclined feeder chute 30, the stop assemblies 42, 42 being spaced apart a distance slightly greater than but approximately corresponding to the diameter of the containers 10 undergoing testing. The stop assemblies 42, 42 may be manually or automatically actuated so as to control the feeding of the containers 10 to be tested along the inclined chute 30 through the pre-test conditioning stations 31, 32, and 33 for the containers 10. To this end, each stop assembly 42 comprises a U-shaped or channel-shaped stop member 42 including a pair of legs at opposite ends of a connecting web portion and projecting above the rail members of the inclined chute 30 on which the containers 10 are supported for rolling movement. It will be understood that the pair of stop members 42, 42 are selectively individually movable from the above-described extended position to a retracted position such that the legs thereof are located below or at the same level as the rail members of the chute 30, thereby permitting the containers 10 to roll past the stop members 42, 42 for subsequent introduction into the next station 34 which is the receiving and ejecting station.

Thus, it will be appreciated that the containers 10 are fed one at a time from the "saturated air" station 33 to the receiving and ejecting station 34 by appropriate manipulation of the stop assemblies 42, 42 between their extended and retracted positions. For example, the respective movement of each stop member 42 between extended and retracted positions may be controlled by a suitable solenoid 43 having a plunger 44 connected to the web portion of channel-shaped stop member 42. Upon providing electrical energy to the solenoid 43, the plunger 44 thereof is retracted so as to lower the stop member 42 through an appropriate slot formed in the bottom wall of the chamber 40, thereby disposing the stop member 42 in a retracted position. The stop members 42, 42 may be actuated in a timed sequence so as to deliver individual containers 10 one at a time into the receiving and ejection station 34 for subsequent delivery to the testing station 35.

The receiving and ejecting station 34 comprises a pair of cradle members 45, 46 for supporting the container 10, the cradle members 45, 46 extending transversely with respect to the inclined feeding chute 30 and being sequentially operated by respective fluid pressure-operated rams 47, 48. In this connection, the respective cradle members 45, 46 are spaced apart a distance less than the diameter of the container 10 so as to support the container 10 thereon following the retraction of the lowermost stop member 42 which permits a container 10 to leave the "saturated air" station 33. As the lowermost stop member 42 is being lowered to retracted position, fluid pressure is exhausted from the ram 47 associated with the cradle member 45 to lower the cradle member 45 to a retracted position for admitting the container 10 to a position between the cradle members 45, 46 in straddling relationship with respect thereto. To facilitate movement of the container 10 to a straddling position between the cradle members 45, 46, it will be observed that the cradle member 45 is provided with an angularly inclined lip portion which constitutes a continuation of the feeding chute 30 when the cradle member 45 is lowered to a retracted position. The cradle member 46 is similarly provided with an angularly inclined lip portion for ejecting the container 10 following completion of the testing thereof at the testing station 35 upon being lowered to a retracted position by operation of the ram 48 associated therewith, as will be hereinafter described.

After being seated in straddling relationship to the cradle members 45, 46 at the receiving and ejecting station 34, the container 10 is then moved transversely with respect to the feeding chute 30 so as to be introduced into the testing station 35 located at one side of the feeding chute 30. The testing station 35 is more fully illustrated in FIGURE 2, as will be described hereinafter. It will be understood that the container 10 is subjected to internal pressurization thereof at the testing station 35 so as to simultaneously test for its ability to withstand a predetermined proof pressure and for fluid leakage therefrom as detected by an ultrasonic detector sensing ultrasonic signals generated by the bursting of bubbles formed in the liquid film coating the exterior surface of the container 10 in any areas where fluid leakage occurs.

Preferably, the testing station 35 comprises a sectional test chamber 50 including a chamber section which is movable into abutment with another chamber section in transferring the container 10 from the cradle members 45, 46 of the station 34 to the testing station 35. A shield 51 may be disposed about the sectional test chamber 50 to provide additional protection against flying fragments should the container 10 be defective so as to fail under internal pressurization thereof causing the container 10 to rupture. In this connection, it will be understood that the sectional test chamber 50 is capable, in most instances, of successfully containing any flying fragments from a container which ruptures while being tested.

While in the sectional test chamber 50 of the testing station 35, the container 10 undergoing testing is internally pressurized up to proof pressure and is monitored for fluid leakage by an ultrasonic detector 52 (FIGURE 2). Following completion of the testing, the container 10 is then depressurized and retracted from the testing station 35 so as to be returned to the cradle members 45, 46 of the receiving and ejection station 34. The ram 48 is then actuated to withdraw fluid pressure therefrom so as to lower the cradle member 46 to a retracted position in which the angularly inclined lip portion thereof is brought into substantial registration with an inclined unloading chute portion 53 of the inclined chute or conveyer 29, the unloading chute portion 53 forming a continuation of the feeder chute portion 30.

It will be determined at the testing station 35 whether a particular container 10 is acceptable as to its ability to withstand a given internal proof pressure and as to the fluid leakage testing thereof. If the container 10 fails to pass either or both of the tests simultaneously performed thereon at the testing station 35, a section of the unloading chute 53 will be automatically repositioned by actuation of a suitable control, such as by energization of a solenoid 54, so that any defective container 10 will be delivered to a rejection bin or receptacle 55, thereby removing the defective container 10 from the remainder of the manufacturing cycle. An acceptable container 10 will be delivered by the lowering of the cradle member 46 to a retracted position onto the unloading chute 53 from where it passes into the film removing and rust inhibiting station 36. The film removing and rust inhibiting station 36 comprises a housing 56 having a dispensing means in the form of a spray nozzle 57 mounted in the top wall thereof so as to dispense a liquid solution onto the container 10. This liquid solution washes off the liquid film or coating applied to the container at the "saturated air" station 33. The liquid mixture or composition dispensed by the spray nozzle 57 may also include constituents for performing certain other desired treatments on the exterior surface of the container 10. For example, the liquid solution may contain a rust inhibitor which protects the exterior surface of the container 10 from rusting. The acceptable container 10 passes through the station 36 by rolling down the unloading chute portion 53 from where it may be directed to other manufacturing systems for additional treatment or removed from the quality control system and placed in storage until used.

Turning now to FIGURE 2 which illustrates the sectional test chamber 50 and associated components thereof disposed at the testing station 35 of the quality control system of FIGURE 3, the sectional test chamber 50 comprises an intermediate cylindrical housing section or body section 58 which is provided with an internal container support element 60 extending axially therewithin in spaced relationship to the internal wall surfaces thereof. The axially elongated container support element 60 is mounted in a partition wall 61 which connects the intermediate body section 58 of the test chamber 50 to a cylindrical end closure section 59 thereof. The container support element 60 is provided with a suitable axially extending passageway with connecting radial ports defining pressure fluid dispensing passages 62 which are adapted to supply pressure fluid to the interior of a container 10 for internal pressurization thereof. To this end, the partition wall 61 is provided with a passageway 63 connected at one end to the axially extending passageway in the axially elongated container support element 60. The other end of the passageway 63 in the partition wall 61 is connected to a suitable pipe fitting, such as a T coupling 64, which is disposed outside of the test chamber 50, the T coupling 64 being respectively connected to a pressure inlet line or conduit 65 and to a pressure outlet line or conduit 66. The pressure inlet line 65 communicates with a source of fluid pressure, thereby providing communication between the source of fluid pressure and the pressure fluid dispensing passages 62 formed in the container support element 60. Suitable valves (not shown) are provided in the inlet and outlet conduits 65, 66, respectively, to regulate the flow of pressure fluid in the passageway 63 in a manner similar to that described in connection with the form of the invention shown in FIGURE 1.

It will be observed that a suitable sealing ring in the form of an elastomeric O-ring seal 67 is mounted on the container support element 60, the O-ring 67 being located adjacent a radial abutment shoulder 70 of the container support element 60. The radial abutment shoulder 70 of the container support element 60 is seated against the partition wall 61 such that its opposite radial surface is adapted to receive the end edge of a container 10 upon insertion of the container 10 within the intermediate body section 58 of the test chamber 50 for testing purposes. When the container 10 is positioned in abutment with the radial shoulder 70 of the container support element 60, the O-ring seal 67 carried by the container support element 60 sealingly engages the container 10, thereby providing a fluid-tight seal between the open end of the container 10 and the container support element 60.

The end closure section 59 of the test chamber 50 defines a sound chamber 71 in which the sensing probe of the ultrasonic detector 52 is disposed, the sound chamber 71 being located on one side of the partition wall 61. The intermediate body section 58 of the test chamber 50 cooperates with a movable end closure section 80 of the test chamber 50 so as to form a pressurization chamber 72 located on the other side of the partition wall 61. Communication between the sound chamber 71 and the pressurization chamber 72 of the test chamber 50 is provided by an enlarged opening 73 through the partition wall 61 connecting the sound chamber 71 and the pressurization chamber 72.

The test chamber 50 may be provided with a suitable pressure relief valve 74, which as shown is located so as to be operably disposed within the sound chamber 71 thereof. It will be understood that the pressure relief valve 74 may be suitably adjusted to a preset position wherein it is adapted to open whenever the pressure within the test chamber 50 exceeds a predetermined magnitude. The test chamber 50 is further equipped with a signaling device 75 adapted to receive signal information from the ultrasonic detector 52 so as to indicate visually and/or audibly the acceptability or unacceptability of each container 10 tested within the test chamber 50 dependent upon the extent of fluid leakage detected therefrom.

The test chamber 50 is mountd upon a suitable stand or table 76 disposed to one side of the inclined chute or conveyor 29 and forming part of the testing station 35. In this respect, the test chamber 50 is aligned with the cradle members 45, 46 of the receiving and ejecting station 34 which is interposed between the feeder chute portion 30 and the unloading chute portion 53 of the inclined chute 29 so as to bridge the gap therebetween dependent upon sequential retraction of the cradle members 45, 46 in the manner previously described.

As indicated previously, means are provided at the receiving and ejection station 34 for inserting a container 10 within the test chamber 50 and subsequently withdrawing the container 10 following completion of the testing thereof. In this respect, the movable cylindrical end closure section 80 of the test chamber 50 also comprises a portion of the loading and unloading assembly of the station 34. To this end, it will be observed that the cylindrical end closure section 80 defining the forward end portion of the sectional test chamber 50 is separable from the intermediate body section 58 thereof and is adapted to be reciprocably movable upon suitable actuation of a pressure-operated ram 81 forming part of the receiving and ejecting station 34. The separable section 80 of the test chamber 50 includes an end closure member 82 therefor having an axially inwardly extending perforated sleeve 83. The sleeve 83 is intended to be disposed in surrounding relation to an end portion of the container 10 to be tested when the container is located in straddling relationship with respect to the cradle members 45, 46 of the station 34. A container holding mechanism 84 is mounted within the sleeve 83 and is so constructed as to retain the container 10 within the sleeve 83 temporarily. In this respect, the holding machanism 84 may comprise a spring-loaded electromagnet where the container 10 is constructed of a magnetizable material such that the container 10 will be held against the electromagnet 84 when the electromagnet 84 is energized and will be released therefrom following de-energization of the electromagnet 84. An elongated ejector pin 85 extends axially through the end closure member 82 for the separable section 80 of the test chamber 50, the inner end of the pin 85 being adapted to abut the end of the container 10. Upon deenergization of the electromagnet 84, the ejector pin 85 is simultaneously actuated so as to be moved to an extended position inwardly of the electromagnet 84, thereby pushing the container 10 away from the electromagnet 84.

Thus, the end closure member 82 for the separable section 80 of the test chamber 50, together with the axial sleeve 83 and the container holding mechanism 84 and ejector pin 85 positioned within the sleeve 83 comprise a driver and receiver head for thrusting the container 10 within the intermediate body section 58 of the test chamber 50 such that the open end of the container 10 is forced against the radial shoulder 70 on the axially elongated container support element 60 in sealing engagement with the O-ring seal 67.

A guide assembly is mounted on the support stand or table 76 to facilitate reciprocating movement of the separable section 80 of the test chamber 50 in response to actuation of the pressure-operated ram 81. The guide assembly comprises spring-loaded rollers 86 mounted on the table or stand 76 and biased upwardly into rolling engagement with the separable section 80 of the test chamber 50. Thus, it will be understood that a container 10 to be tested upon being delivered to the cradle members 45, 46 is received by the separable section 80 of the test chamber 50 which is then disposed at the station 34 in spaced relation to the intermediate body section 58 of the test chamber 50 at station 35. The holding mechanism 84 is actuated, such as by energizing the electromagnet, to hold the forward end portion of the container 10 within the perforated axial sleeve 83 extending inwardly of the end closure member 82. The pressure-operated ram 81 is then actuated to move the separable section 80 toward the intermediate body section 58 of the test chamber 50, the separable section 80 traveling over the guide rollers 86 biased thereagainst until it engages the end edge of the intermediate body section 58 of the test chamber 50. Preferably, an O-ring seal 87 is carried by the end edge of the intermediate body section 58 of the test chamber 50 so as to provide a fluid-tight seal with the separable section 80 when the separable section 80 is moved into abutment therewith.

As the separable test chamber section 80 is moving toward the intermediate body section 58 of the test chamber 50, the container 10 carried thereby is further supported by an internal guide assembly comprising rollers 88 adapted to be urged radially inwardly into rolling engagement with the container 10 by suitable means, such as respective solenoid-operated plungers 89 extending through the wall of the intermediate body section 58 of the test chamber 50 and movable between extended and retracted positions in response to deenergization or energization of solenoids 90 corresponding thereto.

It will be understood that upon positioning the container 10 within the sectional test chamber 50, pressure fluid is introduced into the container 10 through the pressure fluid passages 62 formed in the axially extending container support element 60. The container 10 may thereby be subjected to internal pressurization up to a predetermined proof pressure, while being simultaneously monitored by the ultrasonic detector 52 to detect any fluid leakage therefrom by sensing ultrasonic signals generated by the bursting of bubbles formed and reformed in the thin liquid film deposited on the exterior surface of the container 10 when it was passed through the "saturated air" station 33. The visual and/or audible signaling device 75 indicates to an observer from signal information emanating from the ultrasonic detector 52 the acceptability or non-acceptability of the container 10 being tested simultaneously for ability to withstand proof pressure and for fluid leakage.

Following completion of the testing, the pressure-operated ram 81 is then actuated to retract the container 10 from the sectional test chamber 50 by withdrawing the separable test chamber section 80 with the container holding mechanism 84 actuated to hold the forward end portion of the container 10 within the sleeve 83. The container 10 is thereby replaced on the cradle members 45, 46 in straddling relationship thereto in the station 34, following which the holding mechanism 84 is de-activated, while the ejection pin 85 is actuated to force the container 10 away from the holding mechanism 84. The container 10 is thereby released from the separable test chamber section 80 for subsequent delivery to the unloading chute 53 as previously described.

While specific embodiments of the invention have been illustrated and described, it will be understood that these embodiments are by way of exemplary examples thereof for purposes of description and that various changes may be made in the details of the illustrated embodiments without departing from the scope of the invention.

I claim:

1. A method for detecting fluid leakage from a container, said method comprising the steps of coating the exterior surface of an internally-pressurized container with a thin liquid film, and monitoring the exterior surface of the container to detect ultrasonic signals generated from the bursting of film bubbles formed and reformed in the liquid film by fluid leakage from the container.

2. A method for detecting fluid leakage from a container as set forth in claim 1, further including converting the detected ultrasonic signals into electrical signals indicative of the extent of fluid leakage from the container.

3. A method for detecting fluid leakage from a container as set forth in claim 1, wherein the exterior surface of the container is coated with a thin liquid film by disposing the container within a chamber, and dispensing atomized particles of a liquid mixture within the chamber so as to provide a saturated atmosphere about the container which forms the thin liquid film covering the exterior surface of the container.

4. A method for detecting fluid leakage from a container as set forth in claim 3, further including the step of providing an electrical charge on the exterior surface of the container to attract atomized particles of the liquid mixture from the saturated atmosphere to the exterior surface of the container in establishing and maintaining the thin liquid film covering the exterior surface of the container.

5. A method for detecting fluid leakage from a container, said method comprising the steps of coating the exterior surface of the container with a thin liquid film, introducing fluid under pressure into the container to internally pressurize the container, and monitoring the exterior surface of the container to detect ultrasonic signals generated from the bursting of film bubbles formed and reformed in the liquid film by fluid leakage from the container.

6. A method for detecting fluid leakage from a container as set forth in claim 5, wherein the introduction of fluid under pressure into the container is continued until the internal pressure of the container reaches a predetermined magnitude so that simultaneous testing of the container for its ability to withstand internal pressurization of a predetermined magnitude and for fluid leakage may be accomplished.

7. Apparatus for detecting fluid leakage from a container, said apparatus comprising means for applying a thin liquid film to the exterior surface of the container, and container-monitoring means for sensing ultrasonic signals generated from the bursting of film bubbles formed and reformed in the liquid film by fluid leakage from the container when pressurized.

8. Apparatus for detecting fluid leakage from a container as set forth in claim 7, where said apparatus further comprises a chamber in which the container is adapted to be disposed, said liquid film applying means comprising a nozzle communicating with the interior of the chamber for dispensing atomized particles of a liquid mixture within the chamber providing a saturated atmosphere therein so as to form the thin liquid film covering the exterior surface of the container, and said container-monitoring means comprising an ultrasonic detector having a probe extending into the chamber.

9. Apparatus for detecting fluid leakage from a container as set forth in claim 8, further including means operably associated with the chamber for introducing fluid under pressure into the container to internally pressurize the container.

10. Apparatus for detecting fluid leakage from a container as set forth in claim 7, wherein said apparatus includes at least first and second stations operably associated with each other; said first station comprising a chamber in which the container is adapted to be disposed, and said liquid film applying means; said liquid film applying means comprising a nozzle communicating with the interior of the chamber for dispensing atomized particles of a liquid mixture within the chamber providing a saturated atmosphere therein so as to form the thin liquid film covering the exterior surface of the container; means to advance the container coated with the liquid film from said first station to said second station; said second station comprising a test chamber for receiving the container, means for introducing fluid under pressure into the container to internally pressurize the container when the container is received within said test chamber, and said container-monitoring means; and said container-monitoring means comprising an ultrasonic detector having a probe extending into the test chamber.

References Cited

UNITED STATES PATENTS

| | | | |
|---|---|---|---|
| 2,127,548 | 8/1938 | Boyle et al. | |
| 2,961,869 | 11/1960 | Bagno | 73—45.5 |
| 3,399,563 | 9/1968 | Helms | 73—45.2 |

LOUIS R. PRINCE, Primary Examiner

J. NOLTON, Assistant Examiner

U.S. Cl. X.R.

73—41